May 24, 1966 P. TILLMANN ETAL 3,252,275
APPARATUS FOR THE AGGLOMERATION AND SEPARATION OF FINELY
DIVIDED TITANIUM DIOXIDE FROM ITS GASEOUS VEHICLE
Filed Aug. 21, 1962
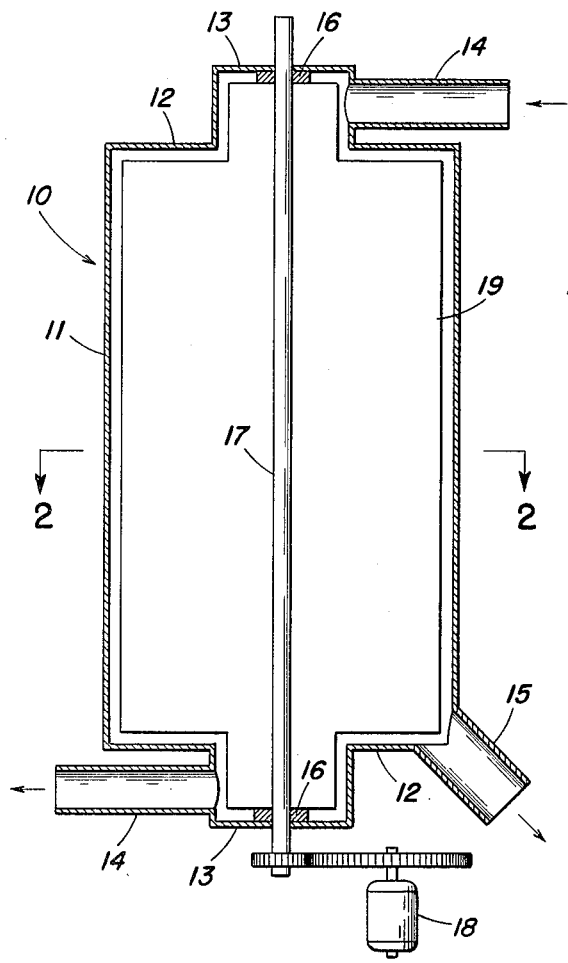
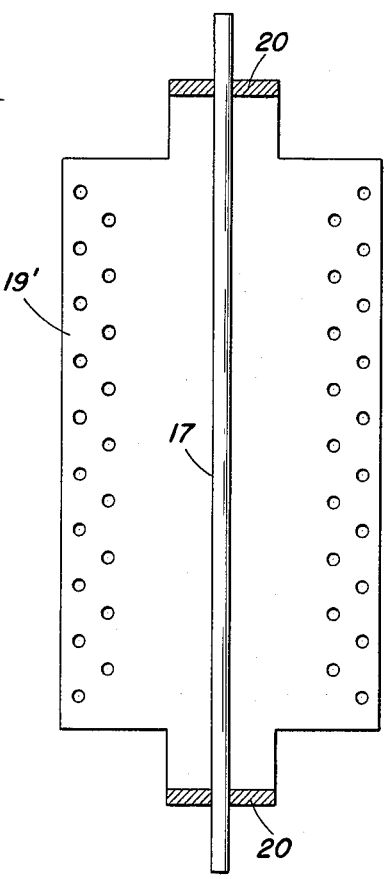
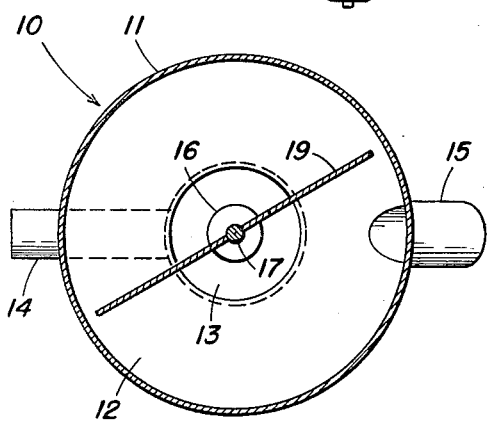
INVENTORS
Hermann Brombach
Achim Kulling
Peter Tillmann (deceased)
BY MARGARETE TILLMANN, SOLE HEIR
BY H. L. Gammons
AGENT United States Patent Office 3,252,275
Patented May 24, 1966

3,252,275
APPARATUS FOR THE AGGLOMERATION AND SEPARATION OF FINELY DIVIDED TITANIUM DIOXIDE FROM ITS GASEOUS VEHICLE
Peter Tillmann, deceased, late of Leverkusen-Wiesdorf, Germany, by Margarete Tillmann, heir, Leverkusen-Wiesdorf, Germany, and Achim Kulling and Hermann Brombach, Leverkusen, Germany, assignors to Titangesellschaft m.b.H., Leverkusen, Germany, a corporation of Germany
Filed Aug. 21, 1962, Ser. No. 218,466
Claims priority, application Germany, Aug. 23, 1961, T 20,638
3 Claims. (Cl. 55—406)

The present invention relates in general to the removal of solid particles from solids-laden gases and more particularly to a means for separating and recovering finely divided $TiO_2$ material from $TiO_2$-laden gases produced by combustion of a mixture of $TiCl_4$ and oxygen at elevated temperatures.

One of the unique and distinguishing characteristics of finely divided $TiO_2$ produced by the so called "vapor phase" reaction of $TiCl_4$ and oxygen is the extremely small particle size of the material and its tendency to stick to stationary surfaces. As a consequence the problem of separating and recovering the solid particles of $TiO_2$ from the $TiO_2$-laden gas stream produced by the vapor phase reaction has not been solved satisfactorily by the use of cyclones, air separators, electro-separators, filters and similar gas cleaning devices heretofore known. Also attempts to use centrifuge separators have encountered difficulties because of the tendency of the finely divided $TiO_2$ to build up a deposit in the equipment as a consequence of which the latter is soon clogged.

Further, apparatus for separating the finely divided $TiO_2$ from the reaction gases by passing the latter through extensive conduits is expensive and difficult to maintain as are the devices which utilize rotating cooling drums. In all such cases the apparatus and methods involved are unsatisfactory primarily because of the size and complexity of the installations required to carry out a separation on a commercial scale.

With the rapid development of the vapor phase process for producing $TiO_2$ the need for an economical apparatus for separating and recovering finely divided $TiO_2$ from the reaction gases is urgent.

An object therefore of the present invention is to provide an improved apparatus for separating and recovering finely divided $TiO_2$ from the reaction gases produced by the combustion of $TiCl_4$ and oxygen at elevated temperatures.

A further object is to provide a relatively simple, efficient and inexpensive apparatus for separating and recovering $TiO_2$ from the $TiO_2$-laden gases produced by the vapor phase reaction of $TiCl_4$ and oxygen.

These and other objects, features and advantages of the invention are described in more detail in the specification and examples which follow.

In the drawing:

FIG. 1 is a schematic showing, in vertical longitudinal section of the apparatus of this invention;

FIG. 2 is a cross-sectional view on line 2—2 of FIG. 1; and

FIG. 3 is a schematic showing, in vertical longitudinal section of a modification of the vane used in the apparatus of FIG. 1.

In general the present invention relates to an apparatus for separating and recovering finely divided $TiO_2$ material from a gas stream formed by the vapor phase reaction of $TiCl_4$ and an oxygen containing gas said apparatus comprising means for introducing said $TiO_2$-laden gas stream into a confined space, agitating the $TiO_2$-laden gas in the confined space violently to effect physical contact between discrete particles of the finely divided $TiO_2$, agglomerating the discrete particle of $TiO_2$ by said violent agitation to form agglomerates of $TiO_2$ within said confined space, separating said agglomerates from the discrete particles of finely divided $TiO_2$ within said confined space by gravity separation, recovering said agglomerates by withdrawing said agglomerates from said confined space and exhausting the substantially $TiO_2$-free gas from said confined space.

The invention relates in particular to unique apparatus used for carrying out the separation and recovery of $TiO_2$ as described above, the apparatus being characterized by: a cylindrical chamber having imperforate walls and arranged with its longitudinal axis in a vertical plane, rotatable agitating means within said chamber said agitating means having a profile corresponding to the profile of said chamber and dimensioned to provide uniform clearance, of the order of about 5 mm., between said agitator and the wall of said chamber, means arranged to rotate said agitating means within said chamber to agglomerate the finely divided discrete particles of $TiO_2$ therein, and flue-means in the wall of said chamber arranged to introduce the $TiO_2$-laden gas into the upper end thereof and to exhaust the substantially $TiO_2$-free gas and the $TiO_2$ agglomerates from the lower end thereof.

As mentioned above the devices heretofore used for separating solid particles suspended in gases have proven unsuccessful when applied to the problem of separating finely divided $TiO_2$ from the $TiO_2$-laden reaction gases produced by vapor phase reaction. However, it has now been discovered that separation and recovery of the $TiO_2$ may be accomplished successfully and economically on a commercial scale by first violently agitating the $TiO_2$-laden gas in an enclosure to bring the discrete particles of $TiO_2$ into intimate physical contact so as to form relatively large agglomerates of $TiO_2$ which, due to their relatively high density, settle out, by gravity separation, from the gas-suspended particles of $TiO_2$ and are withdrawn from the enclosure.

Whereas previous separation equipment has in most instances consisted of multiple units or single units of complex design the apparatus of the instant invention is a single unit of extremely simple and inexpensive construction and adapted for large scale commercial operations. Referring to the drawing, FIGURE 1 is a schematic vertical elevation in cross section of the apparatus which, as shown, comprises a cylindrical chamber indicated generally at 10, of relatively large volume comprising imperforate metal side walls 11, preferably formed of a corrosion and heat resistant metal such as nickel or nickel alloy; and imperforate ends 12—12 joined integrally to the side walls and characterized by cylindrical protuberances or bosses 13—13 of reduced diameter and concentric with the longitudinal axis of the chamber, each boss having a port in one wall thereof to accommodate a flue 14. The flue 14 at the upper end of the chamber is adapted for introducing a $TiO_2$-laden reaction gas into the chamber 10 while the flue at the bottom of the chamber is for exhausting the substantially $TiO_2$-free gas therefrom. A third flue 15 is provided at the bottom of the chamber 10 adjacent its outer edge for discharging the $TiO_2$ agglomerates.

Referring again to the flues 14—14 at the top and bottom respectfully of the chamber 10 it has been found that when the distance between the upper gas-inlet flue and the longitudinal axis of the chamber is the same as the distance between the lower gas-exhaust flue and the longitudinal axis of the chamber no pressure gradient is created in the system when the same is put into operation. This may be a distinct advantage and is the preferred construction when the apparatus is connected directly to a vapor phase reactor for producing the TiO$_2$-laden reaction gases. However, if the aforesaid distances are unequal a pressure differential may be created effective in either direction within the system depending upon the relative distances of the aforesaid flues from the central axis of the chamber; and by selecting a particular ratio of these distances, it is possible to fix, within limits, the direction and force of the pressure differential and hence adapt the apparatus for optimum performance in the system in which it is used.

Mounted at the center of each boss 13 is a bearing 16 for rotatably supporting corresponding ends of a vertical shaft 17 which is adapted to be rotated at relatively high speeds by a power source and drive means indicated schematically at 18. The rotatable shaft 17 has agitating means 19 fixedly secured thereon which in the embodiment shown comprises a substantially flat imperforate blade or vane, see FIGURE 2, preferably formed of a corrosion and abrasion resistant metal such as nickel alloy or the equivalent.

As an essential feature of the invention the shape, i.e. profile of the vane 19 is made to correspond substantially exactly to the profile, in vertical section as shown in FIGURE 1, of the confined space defined by the side walls 11 and end walls 12—12 including the bosses 13—13 of the cylindrical chamber 10. Also as to size, the width and length of the vane 19 are only slightly less than the corresponding dimensions of the confined space within the chamber 10, such that there is uniform clearance between any edge of the vane and the nearest wall of the chamber of about 5 mm. Clearances above 5 mm. contribute to the creation of dead space which clogs with TiO$_2$ thereby reducing the effectiveness of the agglomerating action of the vane and the overall recovery efficiency of the apparatus.

Although the apparatus shown in the drawings utilizes a single imperforate vane 19 it is within the purview of the invention to modify the vane by having perforations along its outer edges, as shown at 19' in FIGURE 3, and by providing discs 20—20 at opposite ends respectively of each necked-down portion of the vane 19' to provide increased stability during operation. The invention further contemplates mounting a plurality of vanes on the central shaft 17.

As pointed out above the apparatus of this invention is designed to be part of a system for producing finely divided TiO$_2$ by the vapor phase technique wherein TiCl$_4$ is reacted with oxygen or an oxygen containing gas at elevated temperatures to produce finely divided TiO$_2$ suspended in a gas stream in the reactor. To fully appreciate the difficulties attending the separation of the finely divided TiO$_2$ from the gas stream it must be realized that TiO$_2$-laden gas has the physical appearance of "smoke" and that the TiO$_2$ suspended in the gas has a paste-like consistency as a consequence of which it adheres to and eventually clogs filter cloths, conduits and other forms of separating equipment.

One means used for recovering the finely divided TiO$_2$ has been to exhaust the TiO$_2$-laden reaction gases into a separating space or chamber (not shown) of very large dimensions in which the TiO$_2$ particles are agglomerated due primarily to the high concentration of TiO$_2$ in the gases. The TiO$_2$ agglomerates, being of relatively high density, settle to the bottom of the chamber, sometimes referred to as a primary separating chamber, from which they are removed. At the outset, i.e. when the TiO$_2$ concentration is high agglomeration takes place quickly. However as the TiO$_2$ concentration decreases agglomeration drops sharply until at TiO$_2$ concentrations of from 10–20% agglomeration is so slow and the space required to effect separation is so large as to be economically unfeasible.

Although the apparatus of this invention may be used to agglomerate the TiO$_2$ suspended in a vapor phase reaction gas of high TiO$_2$ concentration it finds its most useful application in the recovery of TiO$_2$ from a reaction gas of relatively low TiO$_2$ concentration, i.e. one having a TiO$_2$ concentration of from 10–20% TiO$_2$. To this end the gas inlet flue of the agglomerating and separating chamber 10 is connected directly to the exhaust flue of a primary settling chamber which discharges its relatively dilute gases into the chamber 10.

The agglomeration and separation of TiO$_2$ from the TiO$_2$ burdened gas according to the method and apparatus of this invention occurs when, on entering the chamber 10, the discrete particles of TiO$_2$ are thrown into violent agitation by contact with the rapidly rotating vane 19. As a consequence the particles of TiO$_2$ are quickly brought into intimate physical contact to form TiO$_2$ agglomerates of relatively high density which in turn are thrown by centrifugal force against the walls of the chamber. Those agglomerates which, due to their weight, do not adhere to the walls settle by gravity to the bottom of the chamber from which they are withdrawn through the outlet flue 15. The agglomerated TiO$_2$ which tends to stick to the wall is continuously dislodged by the wiping action of the rotating vane 19 and hence also falls by gravity to the bottom of the chamber from which it is withdrawn. It is noteworthy that the TiO$_2$ particles do not adhere to or coat the rapidly rotating vane 19; that the uniform clearance between the vane and the wall of the chamber is insufficient to permit any significant buildup of TiO$_2$ on the walls; and that because the profile of the vane 19 corresponds to that of the chamber 10 no dead spaces, pockets or other recesses are available in which the TiO$_2$ may collect to reduce the efficiency of the separation process or clog the apparatus.

As a general rule an increase in the revolutions per minute of the vane 19 has a favorable effect on the efficiency of separation. With the apparatus shown the vane is rotated in the range of from 1000 to 2500 r.p.m. and preferably from 1500–1800 r.p.m., the particular speed selected depending upon such factors as the concentration of TiO$_2$ in the gases and the retention time of the gases in the chamber for achieving maximum efficiency. Too rapid a throughput will obviously lower the separation efficiency. For maximum efficiency a retention time in the range of from 5 to 50 seconds is used with TiO$_2$ concentrations of from 10–20% in the gas stream.

To further illustrate the invention the following example is given.

*Example 1*

The gases produced by the combustion of TiCl$_4$ with oxygen were conveyed from the reaction zone directly into a primary settling chamber in which the greater part of the TiO$_2$ was agglomerated and settled out because of the high TiO$_2$ concentration of the gas. The gas from which a major portion of the TiO$_2$ had thus been removed contained 100 gram/cu. m. (or about 10%) of finely divided unagglomerated TiO$_2$. This gas was fed into the agglomerating and separating chamber 10 by way of the gas inlet flue 14. The chamber 10 had a height of 800 mm. and a maximum I.D. of 320 mm. The width of the vane 19 was 360 mm. (maximum) which left a clearance of 5 mm. between its edges and the adjacent wall of the chamber; and was rotated at 1700 r.p.m. by drive means 18. Both the chamber and vane were constructed of a noncorrosive abrasion resistant metal. The throughput of gas was 60 cu. m./hr., the retention time of the gas in the chamber being 5 seconds. The gas exhausted from the chamber at the outlet 14 contained but 3 gram/cu. m. TiO$_2$ which indicated a separation efficiency of about 97%.

The invention may be carried out in other specific ways than these herein set forth without departing from the spirit and essential characteristics of the invention and the present embodiments are therefore to be considered in all respects as illustrative and not restrictive, and all changes coming within the meaning and equivalency range of the appended claims are intended to be embraced therein.

What is claimed is:

1. Apparatus for agglomerating and separating finely divided $TiO_2$ particles suspended in a gas stream, said apparatus comprising a cylindrical chamber having imperforate side and lower and upper end walls and arranged with its longitudinal axis in a vertical plane, a substantially planar vane rotatably mounted and vertically aligned in said chamber, the outer edge of said vane having a profile corresponding to the profile of said chamber and dimensioned to provide a uniform clearance of not more than about 5 mm. with the walls of said chamber at any point therein that lies in the same profile with said vane, drive means for rotating said vane at a speed within the range of from 1000–2500 r.p.m. to agglomerate the finely divided $TiO_2$ suspended in said gas stream, flue-means constructed and arranged in the upper end of said chamber to introduce the $TiO_2$-laden gas into said chamber, exhaust means located at the periphery of the side wall at the junction of the side and lower end walls to exhaust the $TiO_2$ agglomerates, and a $TiO_2$ particle free gas exhaust means located centrally in the lower end wall.

2. Apparatus according to claim 1 in which the vane is rotated by said drive means at a speed within the range of from 1500–1800 r.p.m.

3. Apparatus according to claim 1 in which said substantially planar vane has perforations positioned near the outer edge thereof.

References Cited by the Examiner

UNITED STATES PATENTS

| | | | |
|---|---|---|---|
| 815,674 | 3/1906 | Bent | 55—403 |
| 1,292,561 | 1/1919 | Baldwin | 55—401 |
| 1,905,901 | 4/1933 | Clark | 55—69 |
| 1,926,546 | 9/1933 | Lampen | 209—306 |
| 2,139,584 | 12/1938 | Hunter | 23—314 |
| 2,284,105 | 5/1942 | Stageberg | 209—200 |
| 2,721,626 | 10/1955 | Rick | 55—97 |
| 2,737,857 | 3/1956 | Lee | 55—199 X |
| 2,924,847 | 2/1960 | Keiding et al. | 23—313 X |
| 2,980,508 | 4/1961 | Moklebust et al. | 23—303 |
| 3,012,763 | 12/1961 | Martin | 259—9 |
| 3,150,862 | 9/1964 | Grabauskas | 259—9 |

REUBEN FRIEDMAN, *Primary Examiner.*

B. NOZICK, *Assistant Examiner.*